United States Patent [19]

Rodgers, Jr.

[11] 4,243,099
[45] Jan. 6, 1981

[54] SELECTIVELY-CONTROLLED WELL BORE APPARATUS

[75] Inventor: Robert E. Rodgers, Jr., Houston, Tex.

[73] Assignee: Schlumberger Technology Corporation, New York, N.Y.

[21] Appl. No.: 909,317

[22] Filed: May 24, 1978

[51] Int. Cl.³ .................... E21B 47/022; E21B 47/08
[52] U.S. Cl. .................... 166/65 R; 166/237; 166/241; 166/250; 33/178 F
[58] Field of Search .............. 166/65 R, 237, 124, 166/104, 241, 63; 175/50, 77, 78, 325, 272, 273, 285; 33/178 F; 73/151, 152

[56]  References Cited
U.S. PATENT DOCUMENTS

| | | | |
|---|---|---|---|
| 2,291,371 | 7/1942 | Buchanan et al. | 166/124 X |
| 2,310,572 | 2/1943 | Burns | 166/124 |
| 2,701,615 | 2/1955 | Riordan, Jr. et al. | 166/237 X |
| 2,705,167 | 3/1955 | Layne et al. | 166/65 R X |
| 2,944,603 | 7/1960 | Baker et al. | 166/65 R |
| 3,167,707 | 1/1965 | Oliver | 175/50 X |
| 3,338,317 | 8/1967 | Shore | 166/63 X |
| 4,094,359 | 6/1978 | King | 166/65 R |

Primary Examiner—Stephen J. Novosad

[57] ABSTRACT

In the preferred embodiment of the well bore apparatus of the present invention disclosed herein, a new and improved well tool is provided with a plurality of tool-positioning members that are pivotally coupled to the body of the tool and adapted for movement between their respective retracted and extended positions. To control the movements of the tool-positioning members, a selectively-reversible electric motor is cooperatively coupled to the pivotal members in such a manner that upon operation of the motor in one rotational direction, the members are released so as to be free to respectively move toward their extended positions in response to a biasing force selected to extend the members at a predetermined rapid speed of travel. Upon reversal of the motor, the members are recoupled and returned to their retracted positions.

36 Claims, 19 Drawing Figures

SELECTIVELY-CONTROLLED WELL BORE APPARATUS

It will be appreciated that many so-called "wireline service" or well-completion tools employ one or more mechanical devices which, during the operation of the tool, require various kinds of controlled movements. For instance, many wireline tools have one or more wall-engaging members which must be selectively moved into and out of contact with the adjacent wall of a borehole or pipe string as the tool is being operated. U.S. Pat. No. 3,338,317 shows a perforating gun with a wall-engaging member that is selectively extended and then retracted. Various arrangements have also been utilized heretofore for selectively effecting the repetitive movements of such wall-engaging members, with most tools of this nature using a motor-powered hydraulic or mechanical tool-actuating system. By way of example, U.S. Pat. No. 3,685,158 illustrates a typical motor-powered hydraulic actuating system for selectively moving opposed pad-supported electrical-measuring devices into and out of sliding engagement with a borehole wall; and U.S. Pat. No. 3,686,943 shows tools with a motor-driven mechanical actuating system for operating one or more wall-engaging anchors. Likewise, U.S. Pat. No. 2,399,766 is involved with an electrically-powered wireline setting tool to be used in setting retrievable bridge plugs. U.S. Pat. No. 3,167,707 similarly discloses a multi-arm dipmeter and calipering tool that is provided with a motor-driven mechanism used for moving the arms back and forth between their respective operating positions.

In addition to the usual service applications for tools with wall-engaging members such as described in the aforementioned patents, the increasing number of offshore wells throughout the world has called for a reassessment of the applicability of many typical wireline tools for service in such wells. Since many offshore wells are drilled in clusters from a central location, such wells often include nearly-horizontal intervals of considerable length respectively extended outwardly in different directions from the drilling platform. Particular emphasis must be given, therefore, toward facilitating the descent of all types of wireline well tools into such deviated wells. For instance, for logging operations in moderately-inclined wells, those tools requiring accurate centralization are usually effectively supported by bow-spring centralizers and calipers such as shown in U.S. Pat. No. 3,555,689.

As may be expected, however, it is quite difficult to move a spring-centralized logging tool downwardly in well bores having nearly-horizontal intervals since the substantial spring forces needed to maintain the tool properly centered in such flat intervals correspondingly increases the frictional drag of the bow-spring centralizers along the borehole wall. The substantial spring forces needed to achieve suitable centralization of a tool in such well bore intervals will, of course, proportionally increase the amount of weight required to pull a given tool downhole. Although it has been suggested that these bow-spring centralizers might be temporarily held in a retracted position against the tool body, experience has shown this is ordinarily impractical since these tools must frequently be returned to lower depth locations in the borehole. Thus, even if a stout centralizer was temporarily retracted, once the bow springs were released it might well be impossible to later move that tool back down a nearly-horizontal borehole interval.

It will be recognized, therefore, that many types of wireline tools require tool-actuating systems which can be controlled from the surface for selectively extending and retracting arms, bow springs, pads, rollers or other types of wall-engaging members for well tools. Hydraulic actuating systems such as shown in the aforementioned U.S. Pat. No. 3,685,158 are, of course, suitable: but the physical size and quite-significant power requirements of such systems will be excessive in many cases. Moreover, the efficiency of such hydraulic tool-actuating systems is ordinarily significantly less than what would ordinarily be expected with equivalent electrically-driven systems such as the one shown in U.S. Pat. No. 3,686,943. On the other hand, despite their superior operating efficiency, electrical tool-actuating systems such as shown in the last-mentioned patent are generally considered to be too slow for safely operating in those situations where a tool is subject to being easily stuck in the borehole. Those skilled in the art will understand, of course, that the slowness of such systems is not corrected by simply speeding the motor since the attendant increase in power requirements usually makes it impratical or impossible to employ such systems with small-diameter tools.

Accordingly, it is an object of the present invention to provide new and improved well-bore apparatus that is to be repetitively operated and has at least one wall-engaging member that is selectively moved to one of its operating positions at a lower speed than when the wall-engaging member is then moved from that position to another operating position.

This and other objects of the present invention are attained by placing a movable tool-positioning member on a tool body and coupling the tool-positioning member to selectively-rotatable driving means cooperatively arranged so that, upon rotation in one rotational direction the tool-positioning member is uncoupled from the driving means and is then free for movement back and forth between an extended position and a retracted position. Upon rotation in the other rotational direction, the tool-positioning member is recoupled to the driving means and returned to its retracted position.

The novel features of the present invention are set forth with particularity in the appended claims. The invention, together with further objects and advantages thereof, may be best understood by way of the following description of exemplary apparatus employing the principles of the invention as illustrated in the accompanying drawings in which:

FIGS. 2 and 4 are enlarged cross-sectional views of a preferred embodiment of a control mechanism to be used in the practice of the present invention, with these drawings respectively illustrating alternative positions of the control mechanism during its operation;

FIGS. 3–6 are transverse cross-sectional views of different portions of the new and improved control mechanism as shown in FIGS. 2 and 4;

Figure 1:
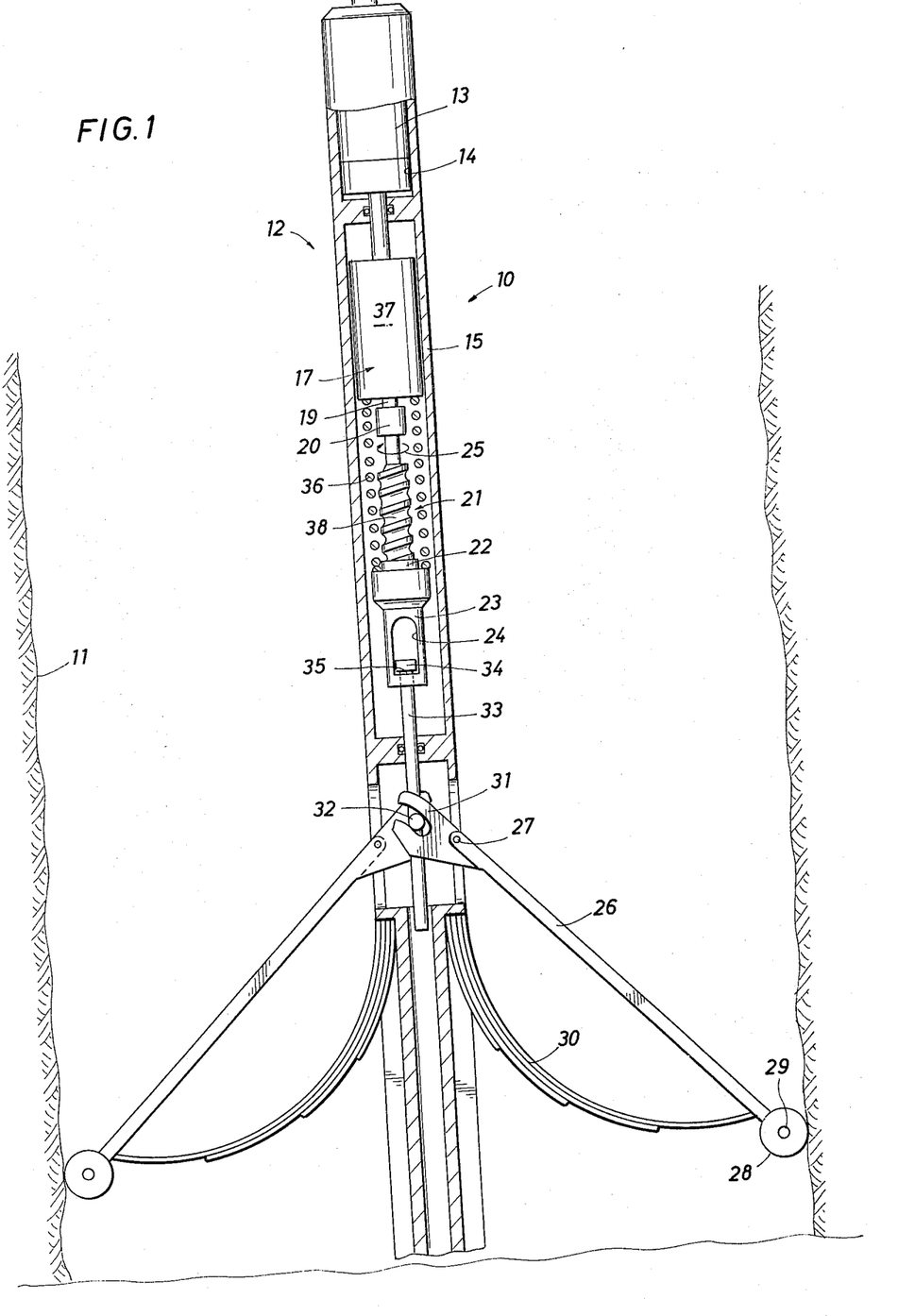
FIG. 1 schematically depicts a new and improved well tool including a motor-driven tool-actuating system arranged in accordance with the present invention.

Turning to FIG. 1, a well tool 10 arranged as may be required for obtaining one or more measurements or performing different services in a well bore such as a cased interval or an open borehole, as at 11, is shown somewhat schematically for purposes of simplifying the forthcoming description of a new and improved tool-actuating system 12 incorporating the principles of the present invention. In its preferred embodiment, the new and improved actuating system 12 includes driving means 13 such as a selectively-reversible, reduced-speed electric motor that is combined with a typical gear-reduction unit and mounted in an enclosed chamber 14 in the upper portion of the body 15 of the tool. The driving means 13 further includes a rotatable output or driving shaft 16 operatively coupled to coupling means as provided by a unique inline control mechanism 17 that is preferably mounted in an oil-filled chamber 18 in the intermediate portion of the tool body 15. As is customary, a typical pressure-balancing bellows or piston (not shown) is arranged at some convenient location on the tool body 15 and adapted as required for maintaining the oil-filled chamber 18 at an elevated pressure commensurate with the hydrostatic pressure of the fluids in the borehole 11 as well as for accommodating thermal expansion of the oil.

In the illustrated embodiment of the coupling means for the new and improved tool-actuating system 12, the output shaft 19 of the control mechanism 17 is coupled, as at 20, to force-and-motion converting means such as a typical ball-bearing screw assembly 21 that is cooperatively arranged for efficiently converting the rotational motions of the output shaft into corresponding rectilinear or reciprocating movements of the body 22 of the screw assembly as well as for converting the longitudinal movements of the screw-assembly body into corresponding rotational motions of the output shaft. The rectilinearly-movable nut or body 22 of the motion-converting assembly 21 is slidably mounted within the intermediate chamber 18 and co-rotatively secured against rotation in relation to the tool body 15 by longitudinally-movable stop means such as a typical longitudinal spline or key (not shown). In the preferred embodiment of the tool-actuating system 12, the screw-assembly body 22 is coupled to a tension-transmitting member such as a tubular shaft 23 having opposed elongated slots, as at 24, on its opposite sides.

It will be appreciated, therefore, that upon selective rotation of the output shaft 19 in, for example, a clockwise direction (as shown in FIG. 1 by the arrow 25), the body 22 and the depending tension-transmitting shaft member 23 will be raised. Alternatively, selective rotation of the output shaft 19 in the opposite rotational direction (i.e., a counterclockwise rotation in this particular example) will be effective for moving the body 22 of the screw assembly 21 as well as the depending tension-transmitting member 23 downwardly. It should also be understood that downwardly-directed forces acting on the screw-assembly body 22 will be effective for imposing a counterclockwise torque on the output shaft 19.

As depicted in FIG. 1, the new and improved tool-actuating system 12 is shown as it is preferably arranged for selectively extending and retracting tool-positioning means including one or more wall-engaging members such as a first pair of elongated rigid arms, as at 26, which are each pivotally connected, as at 27, to opposite sides of the body 15 and cooperatively positioned in relation thereto so as to facilitate their simultaneous operation in a vertical plane of movement that preferably includes the central axis of the tool body. It will, of course, be understood that with the tool 10 being a centralized tool, an independently-movable second pair of arms (not illustrated) is similarly arranged on the tool body 15 and preferably positioned for simultaneous movement in a second vertical plane which substantially perpendicularly intersects the plane of movement for the first pair of arms 26 so as to maintain the tool in a centralized position in well bores such as the borehole 11. Inasmuch as the particular mechanical arrangement used to achieve independent operation of each pair of arms is, for the large part, only incidental to understanding the new and improved tool-actuating system 12 of the present invention, FIG. 1 is presented to show only the first pair of arms 26.

As is typical, well tools such as the tool 10 may also include other types of tool-positioning means with wall-engaging members such as electrode pads or rollers 28 respectively connected to the tool body 15 by pivots as at 29 on the outer end of each of the arms 26. Arm-biasing means, such as an assembly of bowed leaf spring, 30, are cooperatively arranged on the body 15 and respectively adapted for normally urging each of the pivoted arms 26 outwardly from the body with sufficient force to maintain the wall-engaging pads or rollers 29 in contact with the well bore wall. In one convenient arrangement of these biasing springs 30, their upper ends are secured to the body 15 and their outwardly-bowed lower portions are respectively extended downwardly between the pivoted arms and the tool body and positioned so as to impose outwardly-directed biasing forces of a selected magnitude against the rear of the arms 26. It will be recognized, of course, that the magnitude of these biasing forces will depend upon such factors as the overall weight of the tool 10 or whether the arms 26 are carrying the rollers 28 or else pads with electrodes or other types of measurement or sensing devices that must be maintained in intimate sliding contact with the wall surface of a well bore.

In one manner of inter-connecting the new and improved tool-actuating system 12 to the arms 26, their upper end portions are shaped so that each defines a crank-arm extension 31 having an elongated open-ended slot arranged to be operatively fitted over a transversely-oriented crank pin 32 that is mounted on a second tension-transmitting member such as an elongated tubular shaft 33 that has its upper end telescopically disposed within the lower end of the tubular shaft 23. To prevent damage where, for example, one of the rollers 28 strikes a borehole obstruction and the shaft 33 is suddenly forced upwardly, it is preferred to couple this shaft to the upper shaft 23 by a so-called "lost-motion connection" such as may be conveniently provided by disposing a laterally-projecting or enlarged head 34 on the lower shaft within the slots 24 and positioning the head within the upper shaft so as to move upwardly and downwardly above an inwardly-directed shoulder 35 defined by the lower ends of the slots.

It will be recognized, therefore, that with the springs 30 respectively urging the first pair of arms 26 outwardly, by virtue of the two tension-transmitting members 23 and 33 the crank arms 31 will be effective for continuously imposing a downwardly-acting force of substantial magnitude on the rectilinearly-movable body 22 of the motion-converting screw assembly 21. In the preferred embodiment of the present invention, the screw body 22 is also continuously urged downwardly by additional biasing means such as provided by a compression spring 36 that is normally compressed and cooperatively arranged between the body 37 of the control mechanism 17 and the extension shaft 23. These combined downward biasing forces acting on the screw-assembly body 22 are, in turn, effective to continuously impose a commensurate counterclockwise torque on the leadscrew shaft 38 of the screw assembly 21 as well as upon the output shaft 19 of the control mechanism 17.

Figures 2, 3:
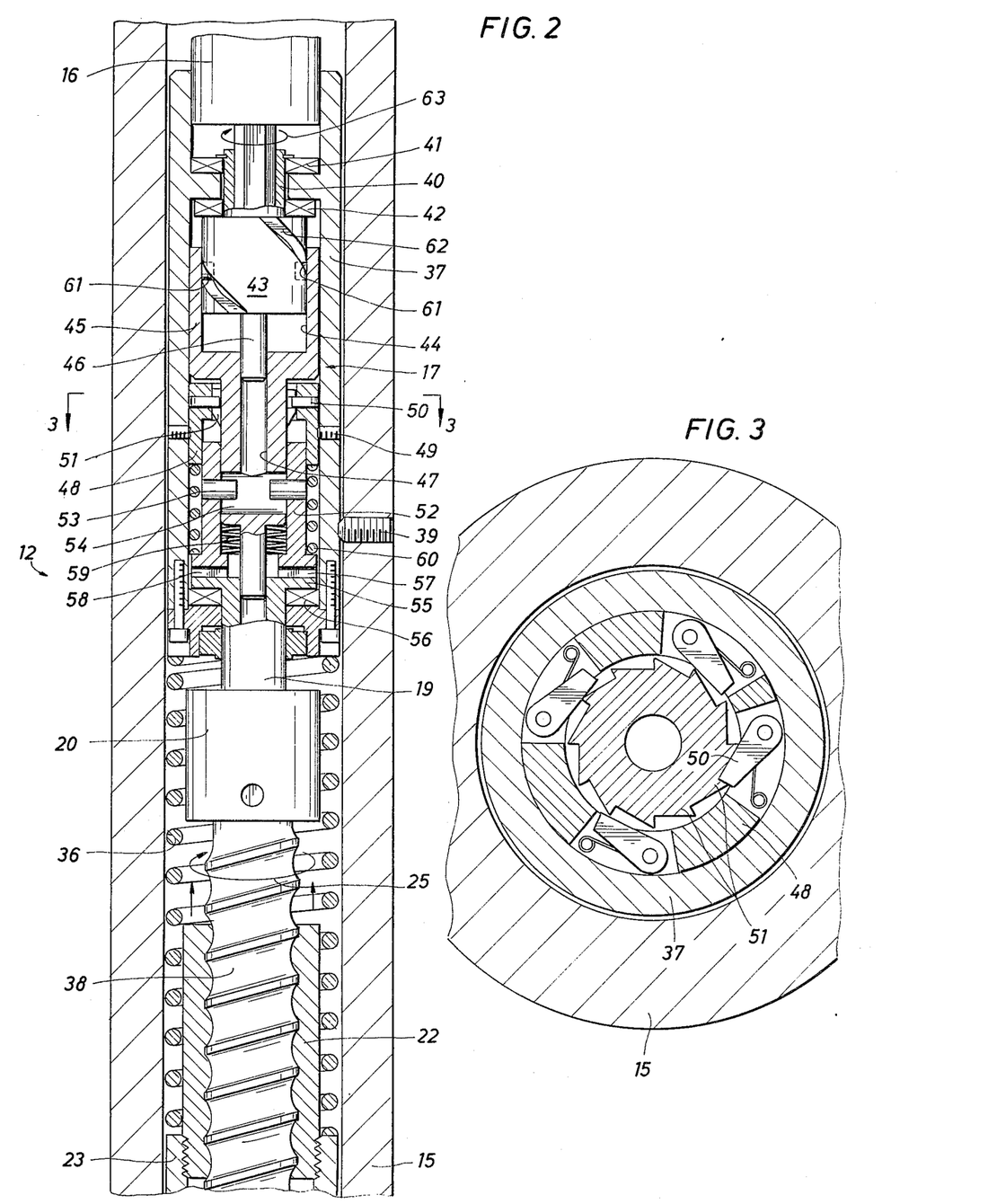

Turning now to FIG. 2, an enlarged, partially cross-sectioned view is shown of a preferred embodiment of the control mechanism 17 of the new and improved tool-actuating system 12, with the unique mechanism itself being somewhat-schematically presented for better illustrating the cooperative interrelationship of its several elements. In this view, the several elements of the mechanism 17 and the upper portion of the screw assembly 21 are shown as they will be respectively positioned when there is no electrical power applied to the driving unit 13 and the arms 26 (not seen in FIG. 2) are retracted against the tool body 15. This is, of course, the so-called "running-in" position of the tool 10.

As depicted in FIG. 2, in the preferred embodiment of the invention, the external housing or case 37 of the control mechanism 17 is secured, as by a set screw 39, to the tool body 15. The lower end of the output shaft 16 of the motor unit 13 is keyed or co-rotatively secured by means, such as by a key or a polygonally-shaped end portion and complementary socket, to the input shaft 40 of the mechanism 17, with this input shaft in turn being coaxially disposed and rotatably journalled within the housing 37 by means such as axially-spaced thrust bearings 41 and 42 arranged for carrying axially-directed loads. The lower end of the input shaft 40 is terminated by an enlarged cylindrical head 43 which is itself coaxially received within a complemental counterbore 44 in the enlarged upper end of a ratchet shaft 45. The ratchet shaft 45 is coaxially disposed within the case 37 and cooperatively arranged for bidirectional rotation as well as for limited axial travel in relation to the case and the enlarged shaft head 43. As an aid for maintaining the inner and outer shafts 40 and 45 in close coaxial relationship, a reduced-diameter axial extension 46 of the enlarged shaft head 43 is rotatably fitted within an axial bore 47 in the lower portion of the ratchet shaft.

The mechanism 17 further includes an annular pawl-support member 48 that is coaxially disposed within the case 37 and firmly secured thereto, as at 49, to remain just below the enlarged head of the ratchet member 45. As best seen in FIGS. 2 and 3, the pawl-support member 48 carries one or more inwardly-biased pawls, as at 50, which are arranged in a typical fashion for cooperation with a plurality of outwardly-directed ratchet teeth 51 spatially disposed around the reduced mid-portion of the ratchet shaft 45. As will be subsequently described, whenever the ratchet shaft is in its depressed or lower operating position depicted in FIG. 2, the pawls 50 are cooperatively engaged with adjacent ones of the ratchet teeth 51 for preventing counterclockwise rotation of the shaft 45 but without unduly limiting its clockwise rotation.

Although the ratchet shaft 45 could just as well be arranged with its lower end serving as a clutch member, it is instead preferred to slidably dispose a tubular clutch member 52 over the shaft and co-rotatively secure these telescoped members to one another such as by one or more inwardly-projecting lateral keys 53 on the outer member that loosely fit an elongated vertical slot 54 in the shaft. The output shaft 19 of the control mechanism 17 is provided with an enlarged upper head 55 which is also arranged as a clutch member. The lower portion of the output shaft 19 is coaxially mounted in the lower end of the outer case 37 and rotatably journalled therein by means such as a thrust bearing 56. Although the opposing faces of the clutch members 52 and 55 could be adapted to provide only frictional co-engagement, it is instead preferred to provide these members with several axially-projecting sectorially-shaped lugs or teeth 57 and 58 which are respectively arranged to be matingly co-engaged whenever the upper member is shifted downwardly into contact with the lower member. Shaft-biasing means, such as a fairly-stout spring or a stack of so-called "Belleville washers" 59 disposed in the annular space defined between the inner and outer clutch members 52 and 55, are arranged for applying an upwardly-directed biasing force on the ratchet shaft 45. Clutch-biasing means, such as a light coil spring 60 between the outer case 37 and the upper clutch member, are also preferably arranged for applying a downward force on the upper clutch member that is sufficient for normally urging the clutch members 52 and 55 together whenever the ratchet shaft 45 is in its lower operating position.

In the preferred embodiment of the control mechanism 17, the longitudinal travel of the ratchet shaft 45 between its lower operating position (FIG. 2) and its upper operating position (FIG. 4) is controlled by camming means such as may be advantageously provided by one or more inwardly-projecting lateral pins 61 arranged on the ratchet shaft and slidably fitted within outwardly-opening, spiraled cam grooves 62 provided on the adjacent surface of the enlarged head 43 of the input shaft 40. By arranging the cam grooves 62 to spiral upwardly in the illustrated counterclockwise direction, clockwise rotation of the input shaft 40 will cause the ratchet member 45 to move downwardly against the upwardly-directed biasing force of the Belleville washers 59 for a sufficient distance to shift the ratchet teeth 51 into the transverse plane of operation of the pawls 50. On the other hand, counterclockwise rotation of the input shaft 40 is effective for axially shifting the ratchet shaft 45 a limited distance upwardly along the cam pins 61. This upward travel of the ratchet shaft 45 in relation to the case 37 will, of course, be effective for raising the ratchet teeth 51 above the transverse plane of operation of the pawls 50 and also allowing the Belleville washers 59 to elevate the upper clutch member so that the clutch members 52 and 55 are disengaged from one another. So long as the clutch members 52 and 55 are disengaged (FIG. 4), the output shaft 19 of the mechanism 17 is allowed to rotate freely in either direction. At the same time, with the ratchet shaft 45 also being elevated, the input shaft 40 of the mechanism is free to turn in a counterclockwise direction since the ratchet teeth 51 are above the transverse plane of operation for the pawls 50.

Accordingly, it will be seen that the operational status of the output shaft 19 of the control mechanism 17 is wholly dependent upon whether the input shaft 40 of the mechanism is stationary or whether the input shaft is being rotated in one or the other of its two rotational directions. For example, with the control mechanism 17 arranged as illustrated, when its input shaft 40 is rotating in a clockwise direction (as depicted by the arrow 63), the output shaft 19 is coupled to the input shaft and will also be rotating in a clockwise direction at the same speed and torque. Conversely, when the input shaft 40 is rotating in a counterclockwise direction, the output shaft 19 of the control mechanism 17 is quickly uncoupled from the input shaft and is then free to rotate wholly independently of the input shaft. On the other hand, when the input shaft 40 is not rotating in either direction, the output shaft 19 of the control mechanism 17 is locked against counterclockwise rotation.

It will be recognized, therefore, that when the motor unit 13 is operated to rotate the output shaft 19 in a clockwise direction (as shown by the arrow 63), the output shaft will quickly turn sufficiently for carrying the cam pins 61 down the inclined cam grooves 62 until the ratchet shaft 45 has been shifted downwardly to its lower position as illustrated in FIG. 2. It will be recognized that continued clockwise rotation of the ratchet shaft 45 will be effective for shifting the upper clutch member 52 downwardly (by way of the downward force developed by the stacked Belleville washers 59) as well as for simultaneously rotating the upper clutch member 52 in a clockwise direction (by way of the pin 53 and the slot 54). The downward biasing force imposed on the upper clutch member 52 by the further compression of the Belleville washers 59 will, of course, be effective for bringing the teeth 57 of the upper clutch member 52 into co-engagement with the teeth 58 on the lower clutch member 55. This clockwise rotation will, therefore, be transmitted to the leadscrew shaft 38 of the screw assembly 21.

It should be noted that although the ratchet teeth 51 have now been shifted downwardly into the plane of operation for the pawls 52, the depicted arrangement of the pawls and ratchet teeth freely accommodates clockwise rotation of the ratchet shaft 45. As previously described, clockwise rotation of the leadscrew shaft 38 elevates the body 22 of the screw assembly 21. Inasmuch as the control mechanism 17 functions to apply the full clockwise torque of the motor unit 13 to the screw assembly 21 directly, it will be appreciated that the force acting to elevate the body 22 of the screw assembly will be more than adequate to overcome the bowed springs 30. Thus, by virtue of the coupling arrangement between the transverse pin 32 and the end portions 31 of the pivoted arms 26, as the body 22 of the screw assembly 21 is raised, the pivoted arms will be retracted against the tool body 15. It will be recognized, of course, that upon retraction of the arms 26, the bowed springs will be energized in accordance with the distance that the arms move inwardly. The degree of energization will ordinarily be an additional or further energization since the springs 30 will usually be arranged to still be partially energized as the arms 26 reach their maximum extended position so that a biasing force will still be acting on the wall-engaging pads or rollers 28.

Once the arms 26 are retracted against the tool body 15, the motor unit 13 is halted and the arms will be retained in their retracted positions by virtue of the unique arrangement of the control mechanism 17. In the retracted positions of the arms 26, the bowed springs 30 will impose substantial outwardly-directed biasing forces on the arms which, in turn, are translated into a corresponding downwardly-acting force on the shaft 33 and the body 22 of the screw assembly 21 that is effective for imposing a counterclockwise torque on the leadscrew shaft 38 which is also applied to the ratchet shaft 45 so long as the clutch teeth 57 and 58 remain co-engaged. It will be recalled, however, that the pawls 50 and the ratchet teeth 51 are cooperatively arranged for restraining the ratchet shaft 45 against counterclockwise rotation. Thus, so long as the ratchet shaft 45 is restrained from counterclockwise rotation, all of the rotating members below the ratchet shaft are similarly restrained and the body 22 of the screw assembly 21 is thereby prevented from moving downwardly.

Figures 4, 5, 6:
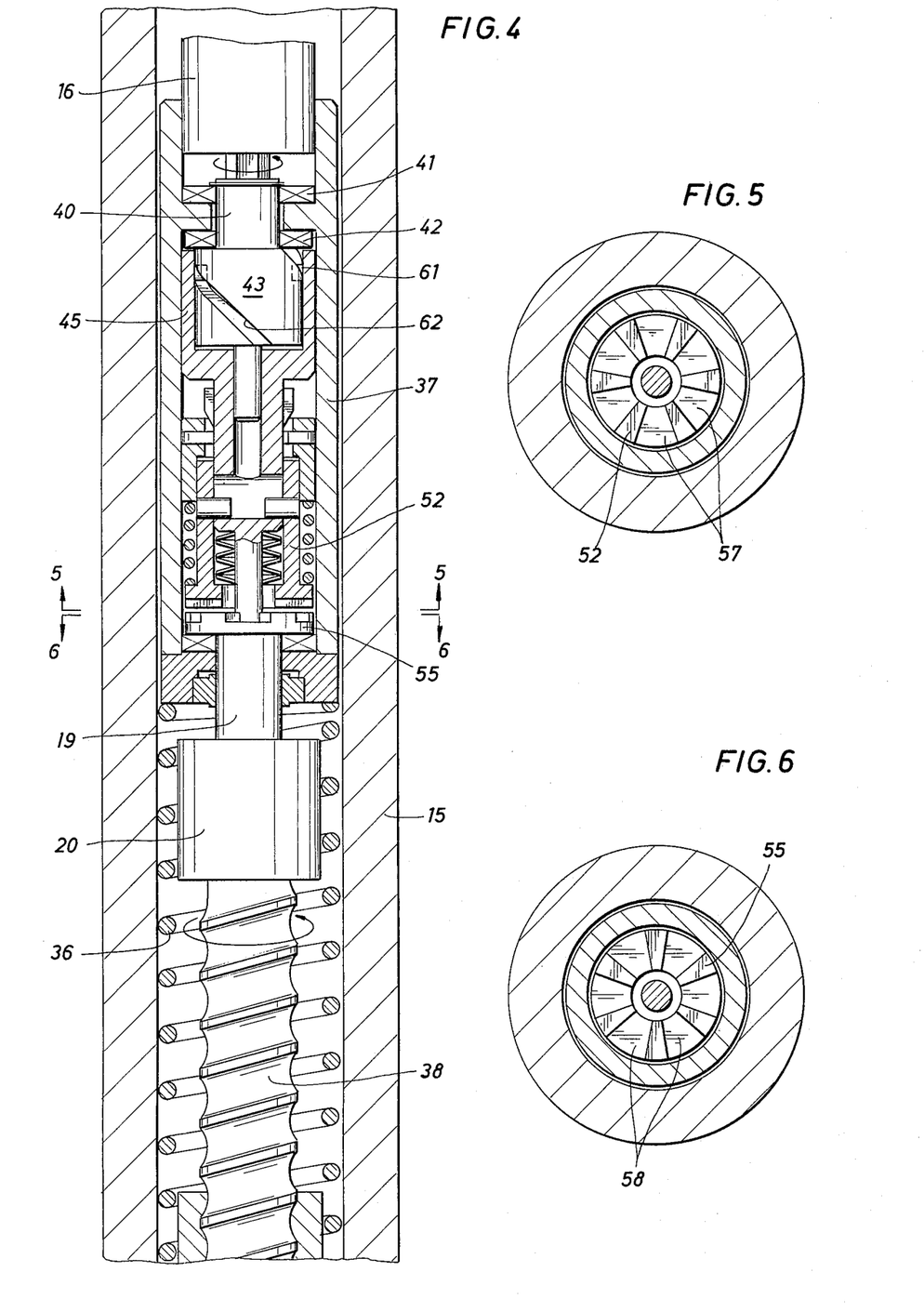

It will also be appreciated that by virtue of the unique arrangement of the control mechanism 17, whenever the motor unit 13 is operated so as to rotate the shafts 16 and 40 in a counterclockwise direction the clutch members 52 and 55 will be disengaged so as to free the arms 26 to be pivoted outwardly by the force of the bowed springs 30. It will be appreciated that upon counterclockwise rotation of the input shaft 40, the cam pins 61 will be carried upwardly along their respective camming grooves 62 to thereby raise the ratchet shaft 45 from its lower operating position depicted in FIG. 2 to its elevated operting position as shown in FIG. 4. As illustrated in the latter drawing, elevation of the ratchet shaft 45 will shift the ratchet teeth 51 above the effective operating plane of the pawls 50 so that the ratchet shaft will now be free to rotate in a counterclockwise direction. At the same time, the key 53 and the slot 54 cooperatively function so that elevation of the ratchet shaft 45 also raises the upper clutch member 52 sufficiently to disengage its clutch teeth 57 from the clutch teeth 58 on the lower clutch member 55.

It will be recognized, therefore, that once the clutch members 52 and 55 are disengaged from one another, the output shaft 19 of the control mechanism 17 is free to rotate. Disengagement of the clutch members 52 and 55 will be effective for moving the body 22 of the screw assembly 21 downwardly as the bow springs 30 then function to drive the arms 26 outwardly to whatever extent may be permitted either by the maximum travel span of the screw-assembly body along the leadscrew shaft 38 or by the diameter of the borehole 11, whichever is the most restricted. It should also be noted that once the clutch members 52 and 55 are disengaged, the outward movement of the arms 26 will ordinarily be quite rapid since there is usually little frictional restraint imposed on the arms by the downward travel of the screw body 22 along the leadscrew 38. It will be further appreciated that once the clutch members 52 and 55 are disengaged and the screw body 22 reaches its lower position, the arms 26 will thereafter be wholly free to pivot inwardly and outwardly in relation to the tool body 15. Thus, as the new and improved tool 10 is subsequently moved through the borehole 11, the arms 26 will be free to move in unison as they follow the irregular wall surfaces of the borehole.

Should it be deemed advisable to retract the arms 26 before the tool 10 is removed from the borehole 11, it is necessary only to restart the motor unit 13 and operate it so as to apply a clockwise torque to the input shaft 40 of the control mechanism 17. As previously described, this rotation will be effective for returning the ratchet shaft 45 to its lower operating position as the cam pins 61 are carried up their respective camming grooves 62 and the clutch members 52 and 55 are quickly re-engaged. As previously described, once the clutch teeth 57 and 58 are again meshed, the pawls 50 and the ratchet teeth 51 will be effective for restraining counter-clockwise rotation of the screw-assembly body 22 and thereby restraining the arms 26 from movement toward their extended positions.

Those skilled in the art will, of course, recognize that in addition to the telescopically-disposed shafts 23 and 33, various arrangements of other tension-transmitting members can also be effectively utilized for returning the arms 26 to their retracted position as the screw-assembly body 23 is elevated. For instance, an assembly of telescoped driven members such as shown in FIG. 6 of Patent No. 3,685,158 could be effectively employed with the tool 10 as one arrangement for returning the two pairs of independently-operable arms, as at 26, to their respective retracted positions against the tool body 15.

With the tool 10, it is preferred to employ an assembly of telescoped driven members cooperatively arranged as shown generally at 63 in FIGS. 7–15. As will be subsequently described in more detail, the arm-coupling assembly 63 illustrated in these drawings is particularly arranged to allow each pair of the pivoted arms, as at 26, to move independently of one another as well as to leave each pair of arms free of its repsective arm-retracting member. The significance of these respective freedoms of movement will subsequently be explained.

As illustrated in FIGS. 7A, 8A, 9, 10 and 11 the jackscrew 38 is cooperatively retained within the tool body by means such as an upright support 64 that is secured with relation to the body 15, as by pins 65, and carries one or more bearings 66 arranged to support lower end of the jackscrew. An elongated tubular body 67 is coupled to the bearing support 64 by a pair of pins 65; and, as illustrated, the tubular body is coaxially mounted within the tool body 15 and cooperatively arranged to slidably receive the lower portion of the tension-transmitting shaft 23. To facilitate the reciprocating movement of the extension shaft 23, a pair of rollers 68 are mounted within a recess in the support 64 and cooperatively arranged for maintaining rolling contact along the opposite sides of the elongated slots 24 in the extension shaft.

Figure 7A:
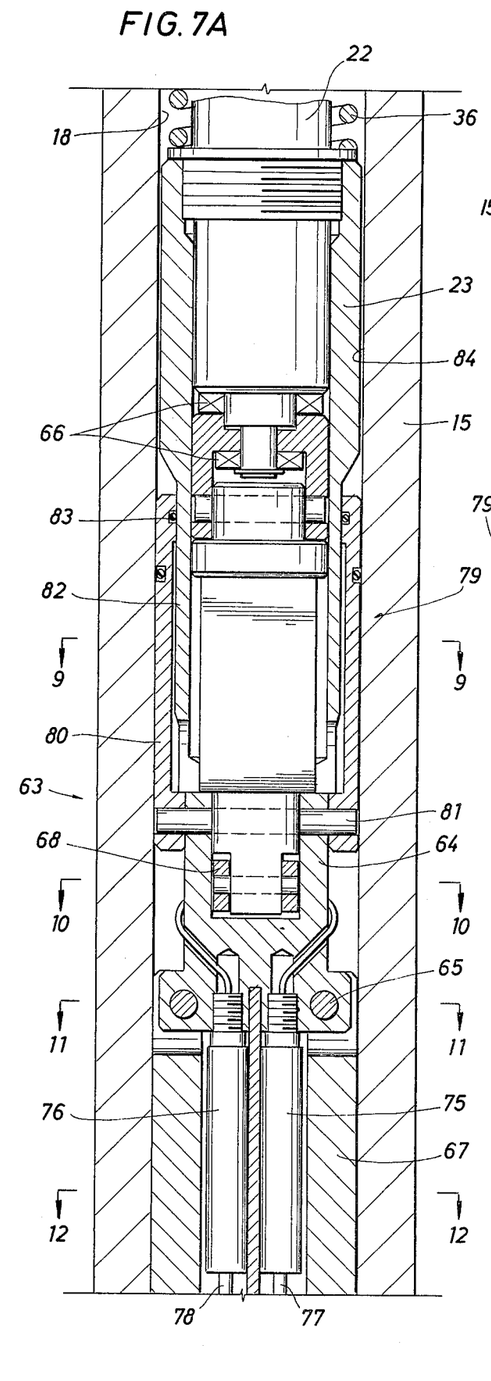
FIGS. 7A–7C are successive longitudinal cross-sectional views showing a preferred embodiment of an arm-coupling assembly which can be incorporated with a well tool utilizing the principles of the present invention.
Figure 7B:
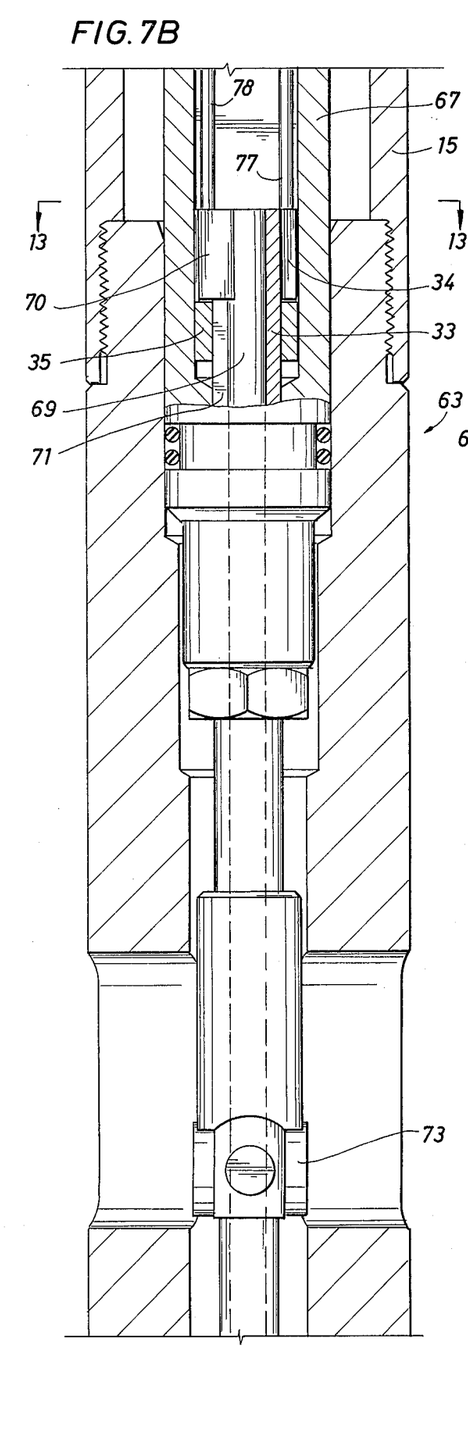
Figure 7C:
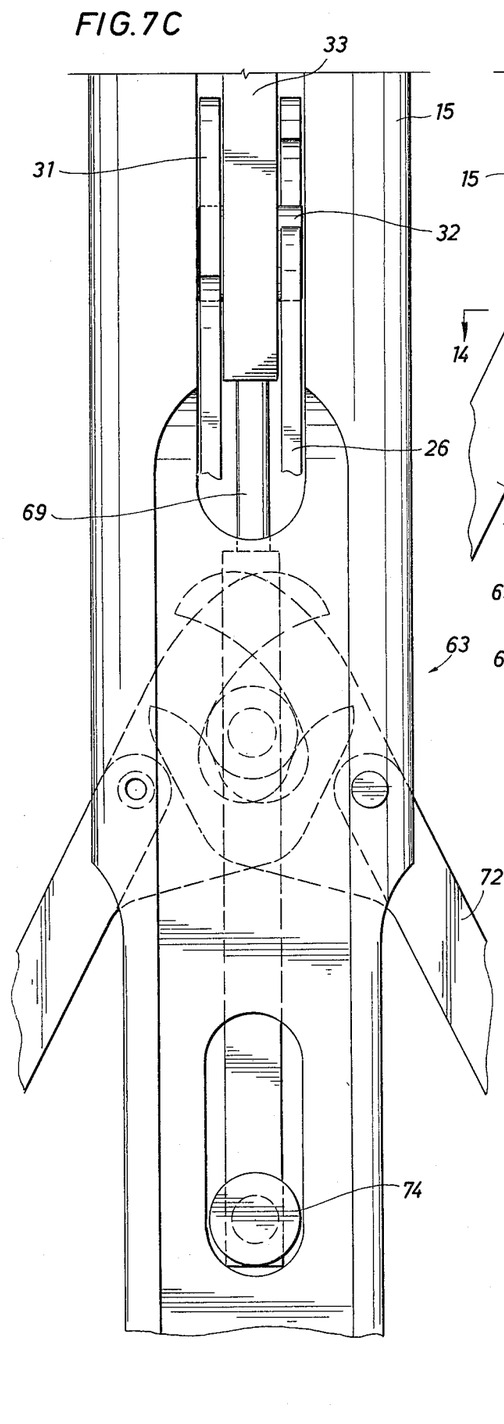
Figure 8A:
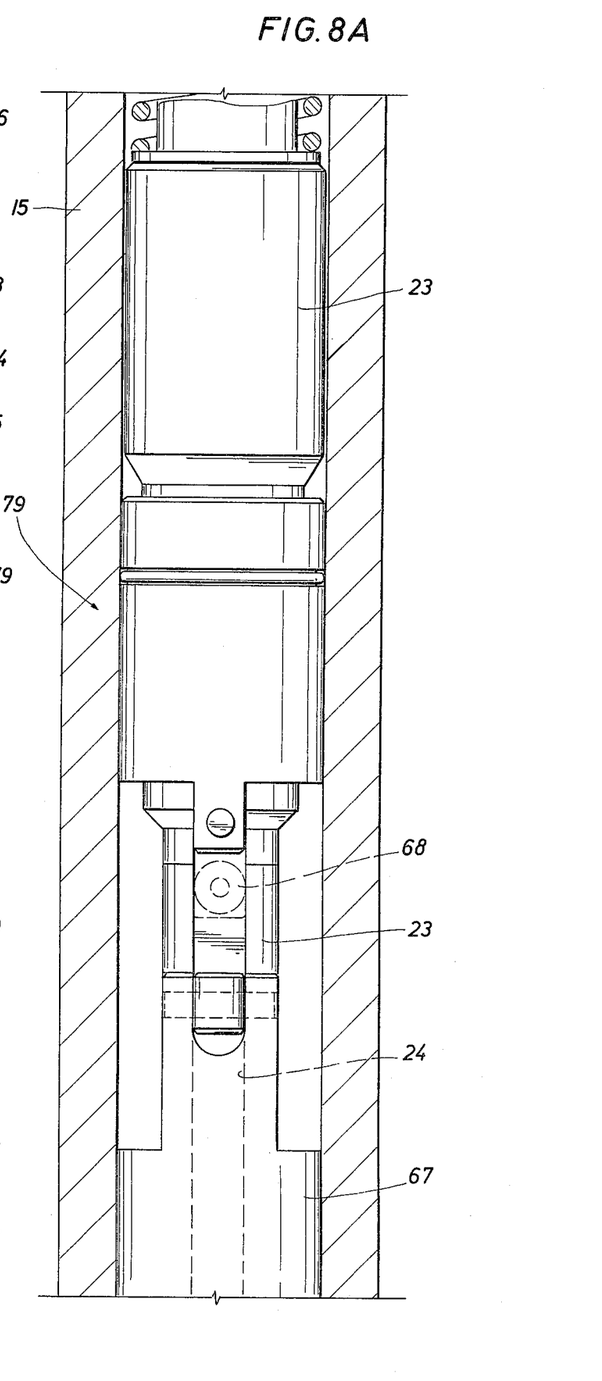
FIGS. 8A-8C are successive longitudinal views which are similar to FIGS. 7A-7C but with each turned at right angles thereto so as to depict further details of the arm-coupling assembly.
Figure 8B:
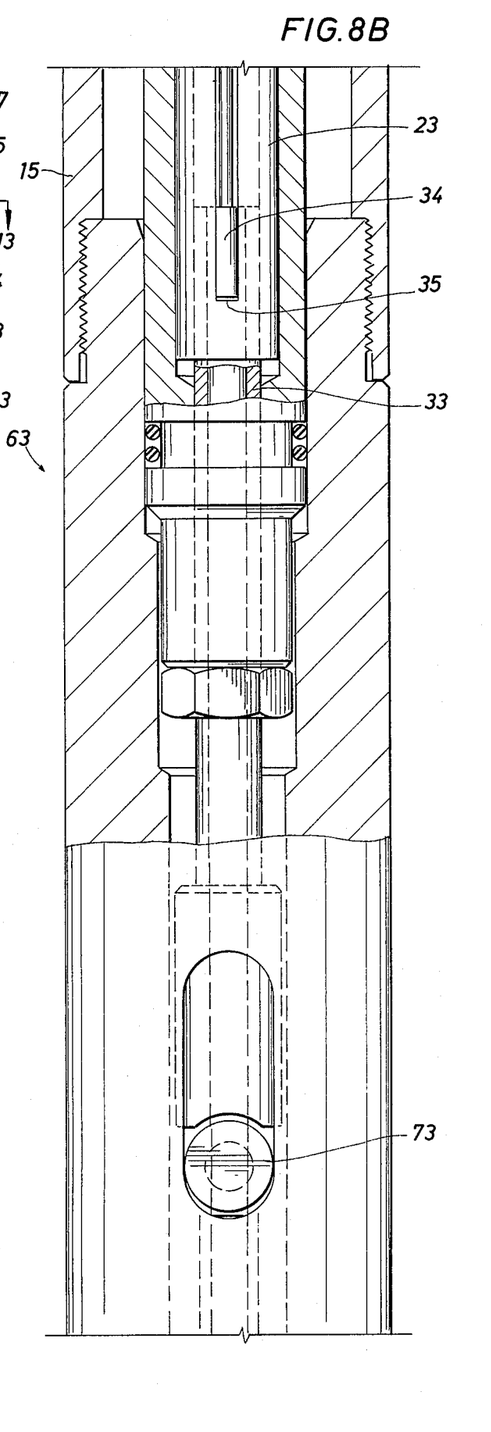
Figure 8C:
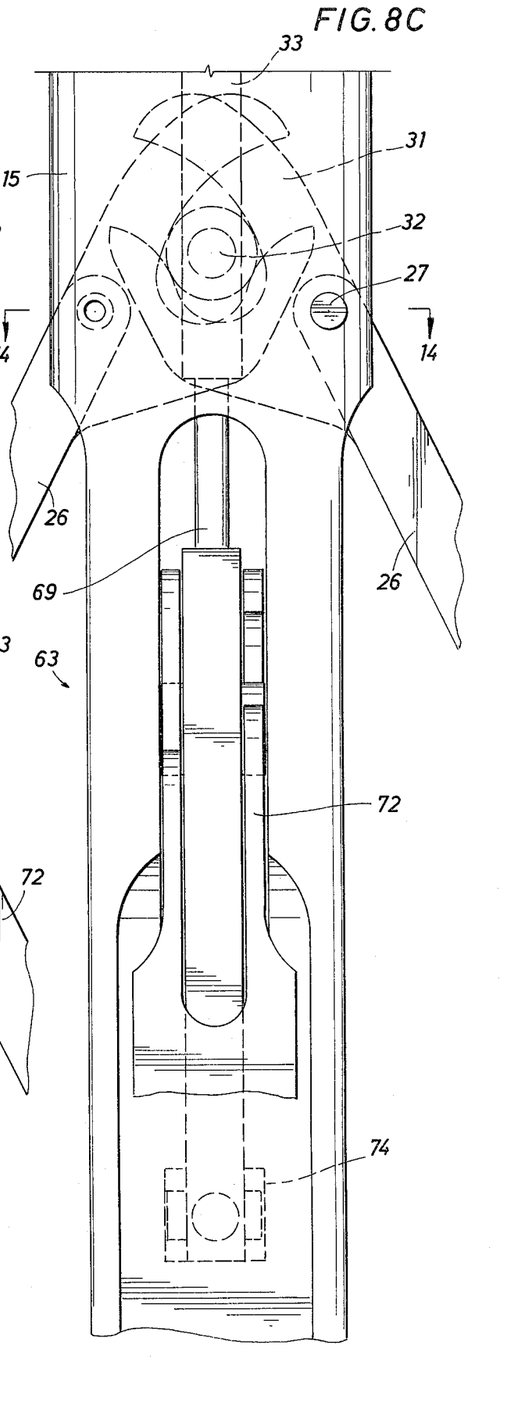
Figure 9:
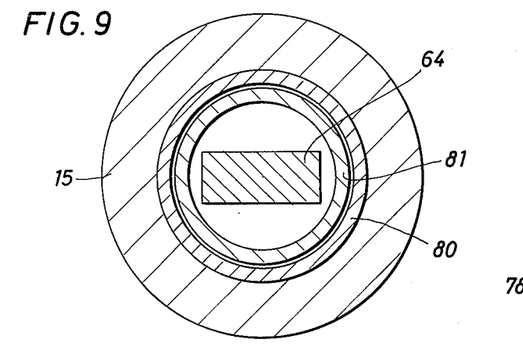
FIGS. 9-14 are transverse cross-sectional views respectively taken along the corresponding section lines as indicated in FIGS. 7A, 7B and 8C.
Figure 10:
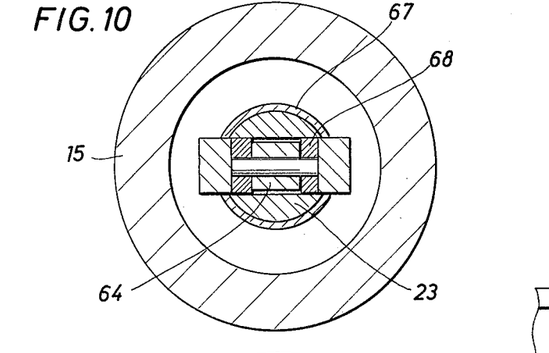
Figure 11:
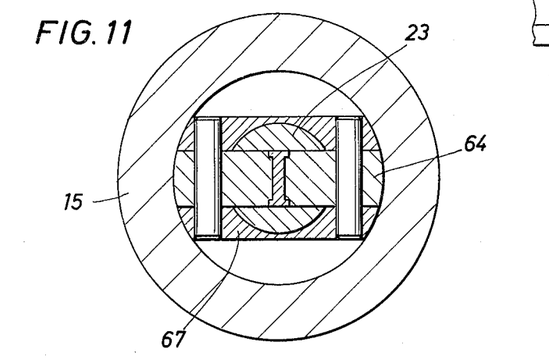
Figure 12:
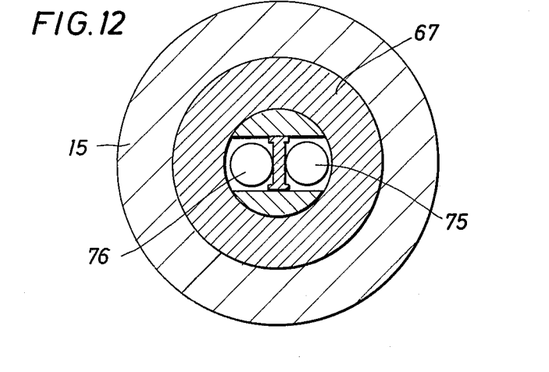
Figure 13:
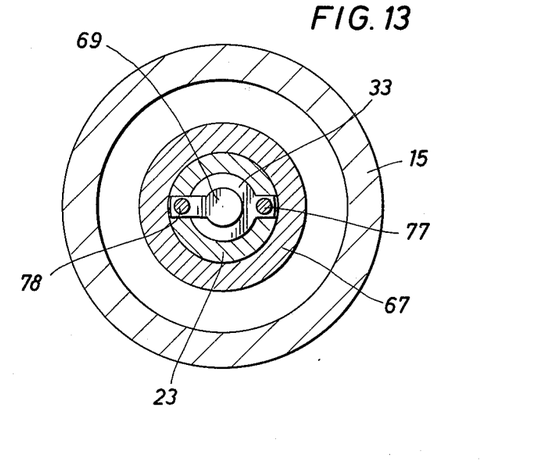
Figure 14:
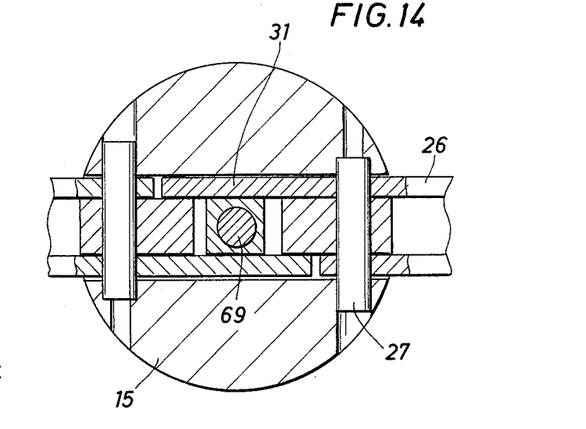
Figure 15:
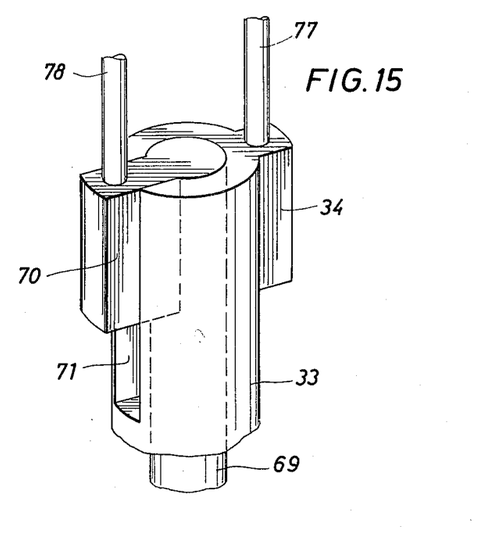
FIG. 15 is an isometric view of one portion of the arm-coupling assembly.

As best seen in FIGS. 7B and 8B, the upper extension shaft 23 is a tubular member and its lower end is arranged to provide the shoulder 35. In keeping with the preceding discussion with respect to FIG. 1, the upper end of the lower extension shaft 33 is slidably fitted within the upper shaft 23 and the enlarged shoulder 35 arranged as a laterally-outstanding projection that is disposed within only one of the slots 24 in the upper shaft. As depicted in FIG. 15, the tubular shaft 33 also slidably receives an elongated rod or shaft 69 which has its upper end arranged to define a laterally-outstanding shoulder 70 that projects through a slot 71 in the shaft 33 and is slidably received in the other slot 24 in the upper shaft 23. In this manner, it will be appreciated that the outer shaft 33 is free for longitudinal movement independently of the inner shaft 69; and that with respect to the extension shaft 23, both of these shafts are also free to move upwardly and downwardly above the shoulders 35 respectively defined by the lower ends of the slots 24.

Accordingly, it will be appreciated that in addition to controlling the movement of the one pair of pivoted arms 26, the interfitted shaft 69 of the arm-coupling assembly 63 also allows another pair of pivoted arms, as at 72, to be independently controlled for operation in a plane of movement at right angles to the plane of movement of the first pair of arms. It should be noted that the depicted arm-coupling assembly 63 further includes one or more sets of longitudinal slots and complementally-fitted rollers, as at 73 and 74, which are cooperatively arranged between the body 15 and assembly to restrain angular turning or twisting of the pivoted arms 26 and 72 in relation to the tool body.

In keeping with the preceeding description of the operation of the new and improved tool 10 and the control mechanism 17, whenever the driving unit 13 is operated to release the pivoted arms, the biasing force of the bowed springs, as at 30, acting to swing the two pairs of pivoted arms 26 and 72 outwarly will also drive the screw body 22 downwardly along the leadscrew shaft 38. Thus, once the arms 26 and 72 respectively reach their maximum outward positions (as determined either when the rollers, as at 28, contact the wall of the borehole 11 or when the arms reach a fixed limited stop on the body 15). The spring 36 biases the upper shaft 23 still further downwardly to a predetermined maximum lower limit selected to be at least a short distance beyond the most-extreme position that the shoulders 34 and 70 could ever be carried to when the pivoted arms are fully extended.

Those skilled in the art will, of course, appreciate that tools such as the tool 10 are also of particular utility in obtaining diameter measurements in cased or uncased wells. Accordingly, in a preferred manner of accomplishing this with the tool 10, one or more movement-responsive electrical transducers having a selectively-variable electrical characteristic, such as a pair of linearly-actuated potentiometers 75 and 76, are mounted in the upper portion of the tubular body 67 and their actuators are each operatively coupled, as by actuator extensions 77 and 78, to the shoulders 34 and 70 respectively. In this way, as either of the shafts 33 or 69 moves upwardly and downwardly, the travel of its respectively-associated shoulder (such as the shoulder 34 on the outer shaft 33) will be directly translated into corresponding movements of the actuator extension 77. The movements of this actuator extension 77 will, therefore, produce a corresponding change in the variable electrical characteristic of the transducer 75 which, in this instance, is electrical resistance. It will be appreciated, of course, that by using separate first and second transducers which are respectively connected to the first and second pairs of arms 26 and 72, the transducers 75 and 76 will provide independent electrical measurements which are respcetively representative of the well bore diameter in the plane of movement for each pair of the arms.

Conventional recording apparatus can, of course, be routinely arranged at the surface for recording these two measurements as a function of depth. For example, FIG. 2 of U.S. Pat. No. 4,006,530 shows a typical recording system which could be suitably used where the tool 10 is to be used solely as a well bore calipering tool. On the other hand, it will be similarly understood that where the tool 10 is also intended to obtain other measurements such as, for example, so-called "dipmeter"

measurements, the recording system will be correspondingly arranged as needed to record such additional measurements as well.

As repeatedly discussed above, successful operations of the new and improved tool 10 requires that the pivoted arms 26 and 72 be free to move outwardly at a speed of travel that is sufficiently rapid to at least minimize the risk that the tool 10 might be stuck. It will, of course, be appreciated that the outwardly-directed biasing forces supplied by the bow springs, as at 30, will generally be of substantial magnitude to assure that their respectively-associated wall-engaging pads or rollers, as at 28, are pressed against a well bore wall with sufficient force to obtain a given measurement. As a result, there can well be situations in the practice of the present invention where substantial spring forces will result in the pivoted arms 26 and 72 being driven outwardly at speeds far greater than what may be necessary for proper operation. Those skilled in the art will, of course, understand that where the tool 10 is at the surface, the quick release of the pivoted arms could easily injure a bystander should one of the arms 26 or 72 strike him. Moreover, such high speed of movement can also needlessly subject various elements of the tool to excessive shocks where the tool 10 is at the surface and the arms 26 and 72 are suddenly propelled to their maximum-extended positions with little or no restriction.

Accordingly, to provide for those situations where particularly-high spring forces are required, the new and improved tool 10 further includes means for controllably retarding the travel speed of the arms 26 and 72. As shown generally at 79 in FIGS. 7A and 8A, the speed-retarding means of the present invention are preferably arranged as illustrated to include a tubular liner or sleeve 80 that is coaxially mounted within the oil-filled space 18 in the tool body 15 and fixed in relation to the body as by a pin 81 securing the sleeve to the central support 64. To complete the speed-retarding means 79, that portion of the extension shaft 23 passing through the sleeve 80 is cooperatively arranged to define a coaxial piston 82 that is sealingly received within a suitable sealing member, such as an O-ring 83, mounted around the interior wall of the sleeve.

Those skilled in the art will appreciate, therefore, that upon upward movement of the extension shaft 23 for pivoting the arms 26 and 72 inwardly toward their respective retracted positions, the speed-retarding means 79 will provide little if any restraint. On the other hand, once the control mechanism 17 is operated to release the arms 26 and 72, the speed-retarding means 79 will cooperatively slow the downward travel of the extension shaft 23 as the downward movement of the piston 82 into the sleeve 80 displaces oil trapped within the sleeve through the narrow annulus 84 around the sleeve and back into the main part of the oil-filled chamber 18 above the piston.

It will, of course, be recognized by those skilled in the art that for a given oil and a particular set of springs 30, the overall length and the extent of the radial clearance space 84 will establish a predetermined and predictable speed of travel for the pivoted arms 26 and 72 which will be somewhat less than their speed of travel in the absence of the speed-retarding means 79. It will be understood, however, that the speed-retarding means 79 are not intended to reduce the rapid rate of travel for extending the arms 26 and 72 to the extent that the full benefits of this rapid extension will be lost.

Accordingly, it will be appreciated that the present invention has provided new and improved apparatus for performing various types of well-completion operations and obtaining different measurements of well bore or formation properties. By arranging one or more extendible wall-engaging members on the tool to be moved quickly and forcefully to one of their operating positions, the wall-engaging members can be retained in their retracted positions until the tool reaches its initial operating depth and then quickly extended without needlessly increasing the risk that the tool might become stuck.

While only a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Well bore apparatus comprising:
body means adapted for passage through a well bore;
driving means including a shaft member cooperatively arranged on said body means and adapted to be alternatively rotated in opposite rotational directions;
tool-positioning means including a tool-positioning member cooperatively arranged on said body means and adapted for free movement back and forth between a retracted position and an extended wall-engaging position; and
means cooperatively arranged on said body means for controlling the movement of said tool-positioning member and including coupling means operable in response to rotation of said shaft member in one of said rotational directions for uncoupling said members so as to then release said tool-positioning member for its said free movement and operable in response to rotation of said shaft member in the other of said rotational directions for releasably intercoupling said members so as to then return said tool-positioning member to its said retracted position, said coupling means having means operable upon return of said tool-positioning member to its said retracted position for selectively restraining retrograde movement of said tool-positioning member toward its said extended position and releasable only upon rotation of said shaft member in said one rotational direction to leave said tool-positioning member free for movement between its said extended and retracted positions.

2. The well bore apparatus of claim 1 wherein said tool-positioning means further include:
spring means cooperatively arranged and adapted to be at least further energized upon movement of said tool-positioning member toward its said retracted position for urging said tool-positioning member outwardly toward its said extended position with a predetermined biasing force commensurate with the degree of energization of said spring means.

3. The well bore apparatus of claim 1 wherein said tool-positioning means further include:
spring means cooperatively mounted between said body means and said tool-positioning member and adapted to be energized upon its movement toward its said retracted position by the driving of said shaft member in said other rotational direction, said spring means being operable whenever said members are uncoupled for urging said tool-positioning member toward its said extended position with a biasing force commensurate with the degree of energization of said spring means.

4. The well bore apparatus of claim 1 wherein said means for selectively restraining retrograde movement comprises ratchet means selectively engageable with said shaft member as it is being driven in said other rotational direction for releasably preventing retrograde rotation of said shaft member in said one rotational direction and selectively releasable in response to the driving of said shaft member in said one rotational direction.

5. The well bore apparatus of claim 4 wherein said tool-positioning means further include:
spring means cooperatively mounted between said body means and said tool-positioning member and adapted to be energized upon return thereof toward its said retracted position and then effective upon uncoupling of said members for urging said tool-positioning member toward its said extended position with a predetermined biasing force selected to move said tool-positioning member outwardly at a controlled speed of travel.

6. The well bore apparatus of claim 5 wherein said biasing force provided by said spring means is selected so that return of said tool-positioning member toward its said extended position is at a lower travel speed than said controlled speed of travel as said tool-positioning member is being moved toward its said extended position by said biasing force.

7. Well bore apparatus comprising:
body means adapted for passage through a well bore;
driving means including a shaft member cooperatively arranged on said body means and adapted to be alternatively rotated in opposite rotational directions;
tool-positioning means including a tool-positioning member cooperatively arranged on said body means and adapted for free movement back and forth between a retracted position and an extended wall-engaging position;
means cooperatively arranged on said body means for controlling the movement of said tool-positioning member and including coupling means operable in response to rotation of said shaft member in one of said rotational directions for uncoupling said members so as to then release said tool-positioning member for its said free movement and operable in response to rotation of said shaft member in the other of said rotational directions for releasably intercoupling said members so as to then return said tool-positioning member to its said retracted position, said coupling means having means operable upon rotation of said shaft member in said other rotational direction for selectively preventing counter-rotation of said shaft member in said one rotational direction and selectively releasable only upon rotation of said shaft member in said one rotational direction for freeing said tool-positioning member for movement toward its said extended position.

8. The well bore apparatus of claim 7 wherein said tool-positioning means further include:
spring means cooperatively mounted between said body means and said tool-positioning member and adapted to be energized upon return of said tool-positioning member to its said retracted position to provide a predetermined biasing force effective upon release of said tool-positioning member for moving it toward its said extended position at a predetermined speed of travel which is faster than the speed at which said tool-positioning member is returned to its said retracted position.

9. The well bore apparatus according to any one of claims 1, 2, 7, 8, 3, 4, 5, or 6 wherein said driving means further include:
a selectively-reversible electrical motor on said body means and cooperatively coupled to said shaft member for alternatively driving said shaft member in either of its said opposite rotational directions.

10. Well bore apparatus comprising:
a tool body adapted for passage through a well bore;
tool-positioning means including at least one wall-engaging member, means pivotally cnnecting said wall-engaging member to said tool body for pivotal movement between a retracted position adjacent to said tool body and an extended position spatially disposed away from said tool body, and spring means cooperatively associated with said wall-engaging member and adaptd to impose thereon a biasing force of predetermined magnitude selected for pivoting said wall-engaging member toward its said extended position at a predetermined speed of travel;
driving means including a shaft member cooperatively arranged on said tool body and adapted to be alternatively driven in opposite rotational directions; and
coupling means cooperatively arranged between said members operable upon rotation of said shaft member in one of said rotational directions for uncoupling said members so that only said spring means are then operative for moving said wall-engaging member toward its said extended position at said predetermined speed of travel and operable upon rotation of said shaft member in the other of said rotational directions for releasably intercoupling said members so as to return said wall-engaging member to its said retracted position at a speed of travel that is less than said predetermined speed of travel.

11. The well bore apparatus of claim 10 wherein said coupling means further include:
means operable upon driving said shaft member in said other rotational direction for selectively preventing retrograde movement of said wall-engaging member toward its said extended position and operable upon driving of said shaft member in said one rotational direction to release said wall-engaging member for free movement between its said extended and retracted positions.

12. The well bore apparatus of claim 10 wherein said spring means include:
at least one arcuately-configured leaf spring mounted between said tool body and said wall-engaging member and adapted to be at least further energized upon movement of said wall-engaging member toward its said retracted position for developing said biasing force commensurate with the degree of energization of said leaf spring to then urge said wall-engaging member toward its said extended position.

13. The well bore apparatus of claim 12 wherein said coupling means further include:

means operable only upon driving of said shaft member in said other rotational direction for selectively halting retrograde movement of said wall-engaging member away from its retracted position and operable only upon driving of said shaft member in said one rotational direction for releasing said wall-engaging member for movement toward its said extended position in response to said biasing force.

14. The well bore apparatus of claim 10 wherein said coupling means further include:
means operable upon rotation of said shaft member in said other rotational direction for selectively preventing counter rotation of said shaft member in said one rotational direction and selectively releasable only upon rotation of said shaft member in said one rotational direction for freeing said wall-engaging member for movement toward its said extended positions.

15. The well bore apparatus according to any one of claims 10, 11, 12, 13 or 14 wherein said driving means further include:
a selectively-reversible electrical motor on said tool body and cooperatively arranged for alternatively driving said shaft member in either of its said rotational directions.

16. Well bore apparatus comprising:
a tool body adapted for passage through a well bore;
tool-positioning means including at least one wall-engaging member, means operatively connecting said wall-engaging member to said tool body for movement back and forth between retracted and extended positions, and spring means cooperatively arranged for acting on said wall-engaging member with a biasing force of predetermined magnitude selected for moving said wall-engaging member toward its said extended position at a predetermined speed of travel;
driving means including a shaft member cooperatively arranged on said tool body and adapted to be alternatively driven in opposite rotational directions; and
coupling means cooperatively arranged on said tool body for selectively intercoupling said members including a rotatable threaded shaft, a threaded body operatively mounted on said threaded shaft and co-rotatively secured in relation to said tool body for axial movement along said threaded shaft as it is rotated, force-transmitting means coupling said threaded body to said wall-engaging member and adapted for transferring forces therebetween, and clutch means operable in response to rotation of said shaft member in one of its said rotational directions for selectively uncoupling said shaft member from said threaded shaft so that said wall-engaging member will be released for movement toward its extended position at said predetermined speed of travel and remain free for movement back and forth between its said extended and retracted positions upon passage of said tool body along a well bore, said clutch means also being operable in response to rotation of said shaft member in the other of its said rotational directions for selectively intercoupling said shaft member to said threaded shaft so that the corresponding axial movement of said threaded body therealong will be effective for returning said wall-engaging member to its retracted position at a speed of travel less than said predetermined speed of travel.

17. The well bore apparatus of claim 16 wherein said coupling means further include:
ratchet means selectively engageable with said shaft member as it is being driven in said other rotational direction for releasably preventing retrograde rotation of said shaft member in said one rotational direction and selectively releasable in response to the driving of said shaft member in said one rotational direction.

18. The well bore apparatus of claim 16 wherein said clutch means include:
a first clutch member coupled to said threaded shaft, a second clutch member cooperatively arranged for movement between two axially-spaced operating positions, and cam means operatively coupling said second clutch member to said shaft member and responsive to rotation thereof in said one rotational direction for axially shifting said second clutch member to one of its said operating positions where said clutch members are disengaged and responsive to rotation of said shaft member in said other rotational direction for axially shifting said second clutch member to the other of its said operating positions where said clutch members are drivingly engaged.

19. The well bore apparatus of claim 18 wherein said coupling means further include:
ratchet means selectively engageable with said shaft member as it is being driven in said other rotational direction for releasably preventing retrograde rotation of said shaft member in said one rotational direction when said clutch members are drivingly engaged and selectively releasable in response to the driving of said shaft member in said one rotational direction when said clutch members are disengaged.

20. The well bore apparatus according to any one of claims 16, 17, 18 or 19 wherein said driving means further include:
a selectively-reversible electrical motor on said tool body and cooperatively coupled to said shaft member for alternatively driving said shaft member in its said opposite rotational directions.

21. Well bore apparatus comprising:
body means adapted for passage through a well bore;
driving means on said body means and adapted for alternative rotation in opposite rotational directions;
tool-positioning means including a plurality of wall-engaging members cooperatively arranged at uniformly-spaced intervals around said body means and respectively adapted for movement between retracted positions adjacent to said body means and extended positions spaced outwardly from said body means;
means cooperatively arranged on said body means for selectively controlling the movements of said wall-engaging members between their said retracted and extended positions and including coupling means between said wall-engaging members and said driving means operable in response to rotation of said driving means in one of said rotational for selectively uncoupling said driving means from said wall-engaging members so that they will be freed for movement between their said extended and retracted positions in response to passage of said body means along a well bore and operable in response to rotation thereof in the other of said rotational directions for selectively intercoupling said driving means to said wall-engaging members so as to bring them toward their said retracted positions;

electrical transducer means on said body means and having a selectively-variable electrical characteristic; and transducer-actuating means coupled to at least one of said wall-engaging members and operable upon movement thereof for proportionally varying said electrical characteristic as a function of well bore diameter.

22. Well bore apparatus comprising:

body means adapted for passage through a well bore;

driving means on said body means and adapted for alternative rotation in opposite rotational directions;

tool-positioning means including a plurality of wall-engaging members cooperatively arranged at uniformly-spaced intervals around said body means and respectively adapted for movement between retracted positions adjacent to said body means and extended positions spaced outwardly from said body means;

means cooperatively arranged on said body means for selectively controlling the movements of said wall-engaging members between their said retracted and extended positions and including coupling means between said wall-engaging members and said driving means operable in response to rotation of said driving means in one of said rotational directions for seletively uncoupling said driving means from said wall-engaging members so that they will be freed for movement between their said extended and retracted positions in response to passage of said body means along a well bore and operable in response to rotation thereof in the other of said rotational directions for selectively intercoupling said driving means to said wall-engaging members so as to bring them towards their said retracted positions;

first and second electrical trnsducer means on said body means and respectively having first and second selectively-variable electrical characteristics; and first and second transducer-actuating means respectively coupled to a first one and to a second one of said wall-engaging members and selectively operable upon their respective movements for proportionally varying said first electrical characteristic as a function of well bore diameter in the plane of movement of said first wall-engaging member and for proportionally varying said second electrical characteristic as a function of well bore diameter in the plane of movement of said second wall-engaging member.

23. The well bore apparatus of claim 22 wherein said plane of movement of said first wall-engaging members lies substantially at right angles to said plane of movement of said second wall-engaging member.

24. The well bore apparatus according to any one of claims 21, 22 or 23 wherein said tool-positioning means further include:

spring means cooperatively arranged and adapted to be at least further energized upon inward movement of said wall-engaging members toward their said retracted positions for urging said wall-engaging members outwardly toward their said extended positions with a biasing force commensurate with the degree of energization of said spring means.

25. The well bore apparatus of claim 24 wherein said driving means further include:

a selectively-reversible electrical motor operatively arranged to be alternatively rotated in said opposite rotational directions.

26. The well bore apparatus according to any one of claims 21, 22 or 23 wherein said wall-engaging members are rigid arms and said tool-positioning means further include:

means pivotally connecting each of said rigid arms to said body means, and spring means cooperatively arranged and adapted to be at least further energized upon pivotal movement of said rigid arms toward their said retracted positions.

27. The well bore apparatus of claim 26 wherein said driving means further include:

a selectively-reversible electrical motor operatively arranged to be alternatively rotated in said opposite rotational directions.

28. The well bore apparatus according to any one of claims 21, 22 or 23 wherein said driving means further include:

a selectively-reversible electrical motor operatively arranged to be alternatively rotated in said opposite rotational directions.

29. Well bore apparatus comprising:

a tool body adapted for passage through a well bore;

driving means including a shaft member cooperatively arranged on said tool body and adapted to be alternatively driven in opposite rotational directions;

tool-positioning means including a first pair of wall-engaging means on diametrically-opposite first sides of said tool body and pivotally coupled thereto for pivotal movement between retracted positions and extended positions lying in a first plane of movement, a second pair of wall-engaging means on diametrically-opposite second sides of said tool body and pivotally coupled thereto for pivotal movement between retracted and extended positions lying in a second plane of movement substantially perpendicularly intersecting said first plane of movement along the longitudinal axis of said tool body, and first and second spring means cooperatively arranged and adapted for respectively urging said first and second pairs of wall-engaging means toward their said extended positions at predetermined speeds of travel; and means cooperatively arranged on said tool body for selectively controlling the independent movements of said first and second pairs of wall-engaging means between their said retracted and extended positions and including coupling means cooperatively arranged on said tool body for selectively intercoupling said shaft member to said first and second pairs of wall-engaging means including a rotatable threaded shaft, a threaded body operatively mounted on said threaded shaft and co-rotatively secured in relation to said tool body for producing axial movement of said threaded body along said threaded shaft as it is rotated, force-transmitting means coupling said threaded body to said first and second pairs of wall-engaging means, and clutch means selectively operable upon rotation of said shaft member in one of its said rotational directions for uncoupling said shaft member from said threaded shaft so that said first and second pairs of wall-engaging means will be released for movement toward their extended positions at their respective predetermined speeds of travel and be freed for movement back and forth between their said extended and retracted positions upon passage of said tool body along a well bore, said clutch means also being selectively operable upon rotation of said shaft member in the other of its said rotational directions for releasably coupling said shaft member to said threaded shaft so that upon its rotation the corresponding axial movement of said threaded body therealong will be effective for returning said first and second pairs of wall-engaging means to their said retracted positions.

30. The well bore apparatus of claim 29 wherein said coupling means further include:
    ratchet means selectively engageable with said shaft member as it is being driven in said other rotational direction for releasably preventing retrograde rotation of said shaft member in said one rotational direction and selectively releasable in response to the driving of said shaft member in said one rotational direction.

31. The well bore apparatus of claim 29 wherein said clutch means include:
    a first clutch member coupled to said threaded shaft, a second clutch member cooperatively arranged for movement between axially-spaced positions, and means operatively coupling said second clutch member to said shaft member and responsive to rotation thereof in said one rotational direction for shifting said second clutch member to one of its said axial positions where said clutch members are disengaged and responsive to rotation of said shaft member in said other rotational direction for shifting said second clutch member to the other of its said axial positions where said clutch members are drivingly engaged.

32. The well bore apparatus of claim 31 wherein said coupling means further include:
    ratchet means selectively engageable with said shaft member as it is being driven in said other rotational direction for releasably preventing retrograde rotation of said shaft member in said one rotational direction when said clutch members are drivingly engaged and selectively releasable in response to the driving of said shaft member in said one rotational direction when said clutch members are disengaged.

33. The well bore apparatus of claim 29 further including:
    first and second electrical transducer means on said tool body and respectively having first and second selectively-variable electrical characteristics; and
    first and second transducer-actuating means respectively coupled to said first and second pairs of wall-engaging means and selectively operable upon their respective movements for proportionally varying said first and second electrical characteristics respectively as a function of well bore diameter in said first plane of movement and as a function of well bore diameter in said second plane of movement.

34. The well bore apparatus of claim 29 wherein said first and second pairs of wall-engaging means include first and second pairs of rigid arms; and said first and second spring means are respectively cooperatively arranged between said rigid members and said tool body to be at least further energized upon movement of said rigid members toward their said retracted positions.

35. The well bore apparatus according to any one of claims 29, 30, 31, 32, 33 or 34 wherein said driving means further include:
    a selectively-reversible electrical motor operatively coupled to said shaft member for alternatively driving it in its said opposite rotational directions.

36. Well bore apparatus comprising:
    body means adapted for passage through a well bore;
    driving means including a shaft member cooperatively arranged on said body means and adapted to be selectively rotated in opposite rotational directions or to remain stationary;
    tool-positioning means including a tool-positioning member cooperatively arranged on said body means and adapted for free movement between a retracted position and an extended wall-engaging position;
    coupling means cooperatively arranged on said body means between said driving means and said tool-positioning means for
    releasing said tool-positioning means for its free movement in response to rotation of said shaft member in a first direction;
    retracting said tool-positioning means to said retracted position in response to rotation of said shaft member in the second other direction; and
    preventing said tool-positioning means from moving from its retracted position until said shaft member is rotated in said first direction.

* * * * *